United States Patent
Fukase (10) Patent No.: US 10,239,305 B2
(45) Date of Patent: *Mar. 26, 2019

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventor: Yasushi Fukase, Numazu (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 15/118,799

(22) PCT Filed: Dec. 25, 2015

(86) PCT No.: PCT/JP2015/086432
§ 371 (c)(1),
(2) Date: Aug. 12, 2016

(87) PCT Pub. No.: WO2017/110001
PCT Pub. Date: Jun. 29, 2017

(65) Prior Publication Data
US 2018/0009166 A1    Jan. 11, 2018

(51) Int. Cl.
*G06F 19/00*      (2018.01)
*B33Y 10/00*      (2015.01)
(Continued)

(52) U.S. Cl.
CPC ............. *B33Y 10/00* (2014.12); *B22F 3/105* (2013.01); *B22F 3/1055* (2013.01);
(Continued)

(58) Field of Classification Search
CPC ....... B33Y 10/00; B22F 3/1055; H05K 3/125; B82Y 20/00; B29C 64/153; Y02P 10/29
See application file for complete search history.

(56) References Cited

U.S. PATENT DOCUMENTS

| | | | |
|---|---|---|---|
| 2001/0002287 A1* | 5/2001 | Kar ...................... | B22F 3/1055 427/554 |
| 2006/0208634 A1* | 9/2006 | Schaepkens ........... | B82Y 20/00 313/506 |
| 2013/0129916 A1* | 5/2013 | Katsumura ............ | H05K 3/125 427/98.4 |
| 2014/0099476 A1 | 4/2014 | Subramanian et al. | |
| 2015/0044084 A1 | 2/2015 | Hofmann et al. | |
| 2015/0298213 A1 | 10/2015 | Beyer et al. | |

(Continued)

FOREIGN PATENT DOCUMENTS

| AT | 13 536 U1 | 2/2014 |
|---|---|---|
| EP | 2 839 905 A1 | 2/2015 |

(Continued)

OTHER PUBLICATIONS

International Search Report (ISR) dated Mar. 22, 2016 for International Application PCT/JP2015/086432.
(Continued)

*Primary Examiner* — Tuan A Vu
(74) *Attorney, Agent, or Firm* — Ladas & Parry LLP (57) ABSTRACT

A dissimilar material joined three-dimensional laminated and shaped object is shaped using a three-dimensional laminating and shaping apparatus. The three-dimensional laminating and shaping apparatus includes a material supplier that supplies materials of a three-dimensional lami-
(Continued)

nated and shaped object to a shaping surface, an irradiator that irradiates the materials with a light beam, and a controller that controls the material supplier. The three-dimensional laminated and shaped object is a joined member obtained by joining dissimilar materials. The controller controls the material supplier to form a graded composition of the materials in a boundary region between the dissimilar materials of the three-dimensional laminated and shaped object.

9 Claims, 8 Drawing Sheets

(51) Int. Cl.
*B22F 3/105* (2006.01)
*B33Y 30/00* (2015.01)
*B33Y 50/02* (2015.01)
*B29C 64/209* (2017.01)
*B29C 64/268* (2017.01)
*B29K 105/00* (2006.01)
*B22F 3/00* (2006.01)

(52) U.S. Cl.
CPC .......... *B29C 64/209* (2017.08); *B29C 64/268* (2017.08); *B33Y 30/00* (2014.12); *B33Y 50/02* (2014.12); *B22F 3/008* (2013.01); *B22F 2998/10* (2013.01); *B22F 2999/00* (2013.01); *B29K 2105/251* (2013.01); *Y02P 10/295* (2015.11)

(56) References Cited

U.S. PATENT DOCUMENTS

| | | |
|---|---|---|
| 2016/0115571 A1 | 4/2016 | Kestler et al. |
| 2016/0318104 A1 | 11/2016 | Ott et al. |
| 2016/0339520 A1* | 11/2016 | Zhang .................. B33Y 10/00 |
| 2017/0144248 A1 | 5/2017 | Yoshimura et al. |

FOREIGN PATENT DOCUMENTS

| | | |
|---|---|---|
| EP | 3 112 134 A1 | 1/2017 |
| JP | 10-226803 A | 8/1998 |
| JP | 2015-183288 A | 10/2015 |
| WO | 2011/155214 A1 | 12/2011 |
| WO | 2015/094720 A1 | 6/2015 |
| WO | 2015/151865 A1 | 10/2015 |

OTHER PUBLICATIONS

Written Opinion (Wo) dated Mar. 22, 2016 for International Application PCT/JP2015/086432.
J-PlatPat English abstract of JP 2015-183288 A.
Japanese Office Action dated Jan. 24, 2017 in connection with corresponding Japanese Application No. 2016-510842 with English translation.
J-PlatPat English abstract of JP 10-226803 A.
European Search Report (ESR) dated Apr. 6, 2018 for EP Application No. 15 898 477.3.

* cited by examiner

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is a an application under 35 U.S.C. 371 of International Application No. PCT/JP2015/086432 filed on Dec. 25, 2015, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of bonding a magnesium member and an aluminium member into a bonded member by providing an intermediate layer between them (paragraph [0026] of the literature and the like).

CITATION LIST

Patent Literature

Patent literature 1: International Publication No. 2011/155214

SUMMARY OF THE INVENTION

Technical Problem

In the technique described in the above literature, however, it is impossible to shape a dissimilar material joined three-dimensional laminated and shaped object using a three-dimensional laminating and shaping apparatus.

The present invention enables to provide a technique of solving the above-described problem.

Solution to Problem

One aspect of the present invention provides a three-dimensional laminating and shaping apparatus comprising:

a material supplier that supplies materials of a three-dimensional laminated and shaped object to a shaping surface;

an irradiator that irradiates the materials with a light beam; and a controller that controls the material supplier, wherein the three-dimensional laminated and shaped object is a joined member obtained by joining dissimilar materials, and the controller controls the material supplier to form a graded composition of the materials in a boundary region between the dissimilar materials of the three-dimensional laminated and shaped object.

Another aspect of the present invention provides a control method of a three-dimensional laminating and shaping apparatus including a material supplier that supplies materials of a three-dimensional laminated and shaped object to a shaping surface, an irradiator that irradiates the materials with a light beam, and a controller that controls the material supplier, wherein the three-dimensional laminated and shaped object is a joined member obtained by joining at least two kinds of materials, the method comprising:

causing the controller to control the material supplier to form a graded composition of the materials in a boundary region of the three-dimensional laminated and shaped object.

Still other aspect of the present invention provides a control program of a three-dimensional laminating and shaping apparatus including a material supplier that supplies materials of a three-dimensional laminated and shaped object to a shaping surface, an irradiator that irradiates the materials with a light beam, and a controller that controls the material supplier, wherein the three-dimensional laminated and shaped object is a joined member obtained by joining at least two kinds of materials, the program for causing a computer to execute a method, comprising:

causing the controller to control the material supplier to form a graded composition of the materials in a boundary region of the three-dimensional laminated and shaped object.

Advantageous Effects of Invention

According to the present invention, it is possible to shape a dissimilar material-joined three-dimensional laminated and shaped object using a three-dimensional laminating and shaping apparatus.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

A three-dimensional laminating and shaping apparatus 100 according to the first embodiment of the present invention will be described with reference to FIGS. 1 to 4B.

<Technical Premise>

Figure 4A:
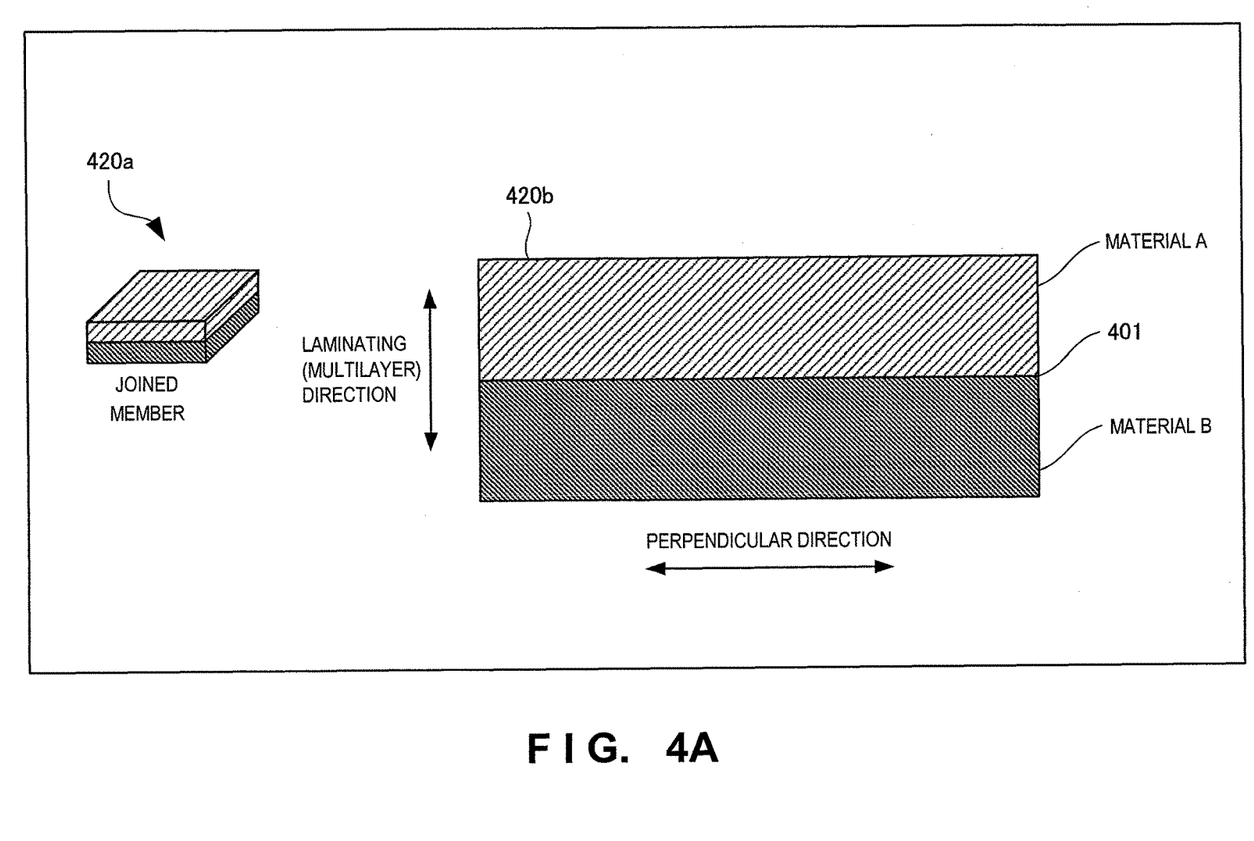
FIG. 4A is a sectional view for explaining the arrangement of a joined member manufactured by a technical premise of the three-dimensional laminating and shaping apparatus according to the first embodiment of the present invention.
Figure 4B:
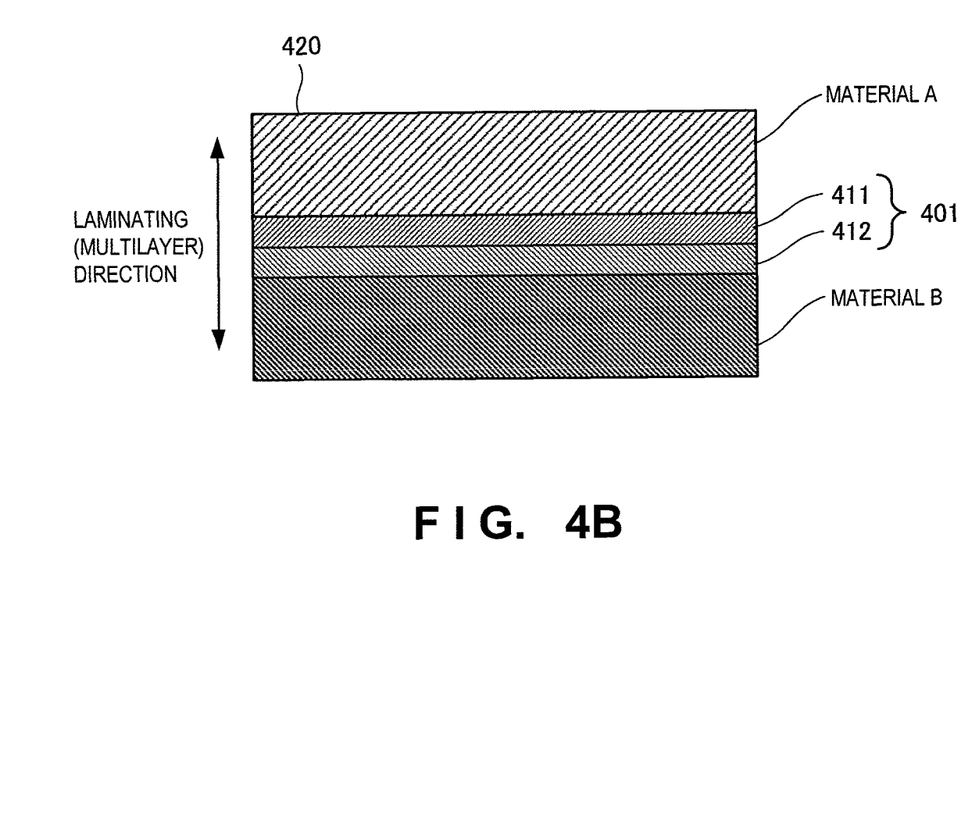
FIG. 4B is a partially enlarged sectional view for explaining the arrangement of the joined member manufactured by the technical premise of the three-dimensional laminating and shaping apparatus according to the first embodiment of the present invention.

A joined member 420 according to a technical premise of a three-dimensional laminated and shaped object 120 shaped by the three-dimensional laminating and shaping apparatus 100 according to this embodiment will be described with reference to FIGS. 4A and 4B. FIG. 4A is a sectional view for explaining the arrangement of a joined member manufactured by the technical premise of the three-dimensional laminating and shaping apparatus according to this embodiment. FIG. 4B is a partially enlarged sectional view for explaining the arrangement of the joined member manufactured by the technical premise of the three-dimensional laminating and shaping apparatus according to this embodiment.

As shown in 420a and 420b of FIG. 4A, a joining interface 401 of the joined member 420a obtained by joining dissimilar materials is joining of the plane of a member made of material A and that of a member made of material B. In this case, as shown in FIG. 4B, to relax a residual stress caused by a difference in thermal expansion between materials A and B, the joined member 420b may have a structure in which an intermediate material A' 411 and an intermediate material B' 412 are provided in the joining interface 401. That is, the intermediate material A' 411 and the intermediate material B' 412 serve as adhesives. Such structure increases the adhesive force between materials A and B, thereby obtaining the joined member 420b having a stable joining strength.

However, for example, to shape such structure by the three-dimensional laminating and shaping apparatus which adopts the LMD (Laser Metal Deposition) method, a mechanism of mixing materials A and B and a mechanism of adjusting the mixing amounts of materials A and B are necessary. Since it is also necessary to precisely control a material supply position, the shaping position of the joining interface 401, and the like, a mechanism of precisely controlling the above positions becomes necessary, thereby complicating the apparatus arrangement of the three-dimensional laminating and shaping apparatus.

<Technique of Embodiment>

Figure 1:
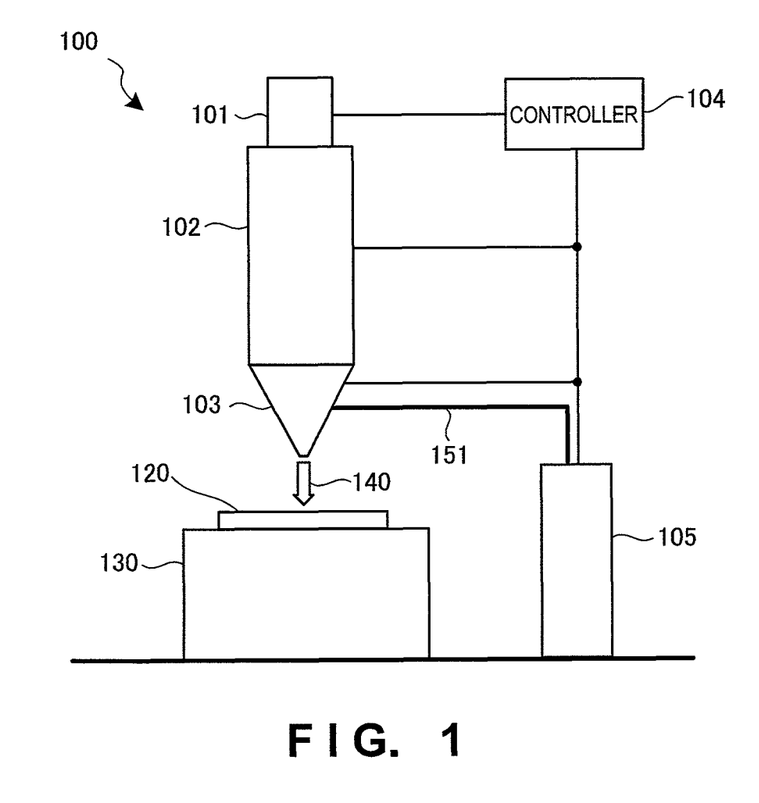
FIG. 1 is a view for schematically explaining the arrangement of a three-dimensional laminating and shaping apparatus according to the first embodiment of the present invention.

FIG. 1 is a view for schematically explaining the arrangement of the three-dimensional laminating and shaping apparatus 100 according to this embodiment. Note that in FIG. 1, to avoid the view from becoming complicated, members other than those shown in FIG. 1 are not illustrated, as needed.

The three-dimensional laminating and shaping apparatus 100 is an apparatus for shaping a three-dimensional laminated and shaped object 120 on a shaping table 130 by melting and solidifying metal powders or the like as materials of a three-dimensional laminated and shaped object by irradiating the metal powders with a laser beam, and laminating the metal powders.

As shown in FIG. 1, the three-dimensional laminating and shaping apparatus 100 includes a light source 101, a lens barrel 102, a nozzle 103, a controller 104, and a material storage 105. The light source 101 generates a laser beam. The lens barrel 102 adjusts the path of the generated laser beam, thereby guiding the laser beam to the shaping table 130. The nozzle 103 sprays a carrier gas 140 from the distal end of the nozzle 103 to supply the materials of the three-dimensional laminated and shaped object 120 onto the shaping table 130. The carrier gas 140 is an inert gas such as argon gas, nitrogen gas, or helium gas, and is a gas for conveying the metal powders or the like as the materials of the three-dimensional laminated and shaped object 120 onto the shaping table 130. The material storage 105 stores the materials of the three-dimensional laminated and shaped object 120, and supplies the materials to the nozzle 103 via a material delivery tube 151 by force feed or the like.

The controller 104 is connected to the light source 101, lens barrel 102, nozzle 103, and material storage 105. The controller 104 controls the light source 101 to adjust the output and the like of the laser beam or the like. Similarly, the controller 104 controls the lens barrel 102 to adjust the optical axis, focusing state, and the like of the laser beam or the like. Furthermore, the controller 104 controls the nozzle 103 and material storage 105 to adjust the scanning speed of the nozzle 103, the spray amount of the carrier gas 140 from the nozzle 103, and the like, thereby adjusting the supply amounts of the materials.

Figure 2A:
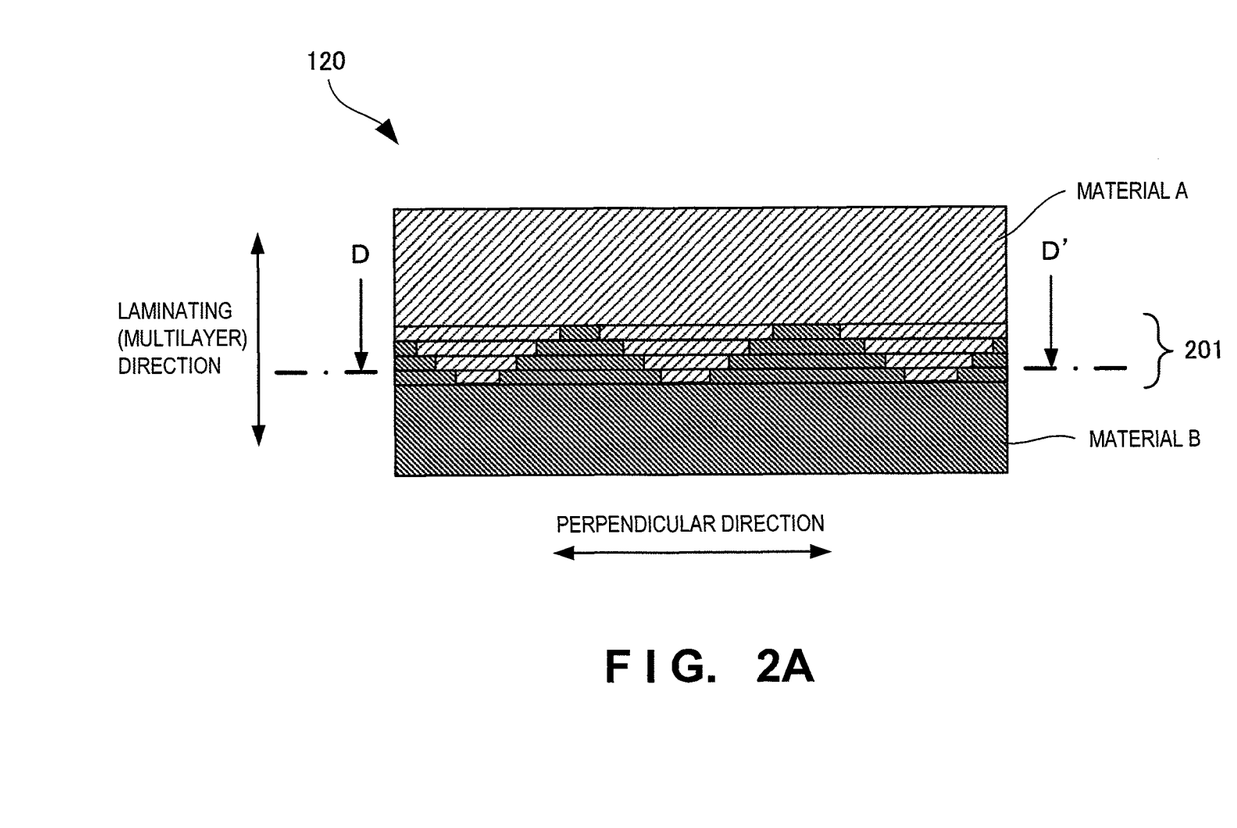
FIG. 2A is a sectional view for explaining the arrangement of a dissimilar material-joined three-dimensional laminated and shaped object shaped by the three-dimensional laminating and shaping apparatus according to the first embodiment of the present invention.

FIG. 2A is a sectional view for explaining the arrangement of the dissimilar material joined three-dimensional laminated and shaped object 120 shaped by the three-dimensional laminating and shaping apparatus according to this embodiment. The dissimilar material-joined three-dimensional laminated and shaped object 120 has a corrugated graded composition formed in a direction perpendicular to a laminating (multiplayer) direction in a joining interface 201 between materials A and B. Since forming the graded composition in the joining interface 201 increases the adhesion area between multiplayer materials (materials A and B) to distribute a stress generated in the joining interface 201, the joining strength between materials A and B can be ensured.

Figure 2B:
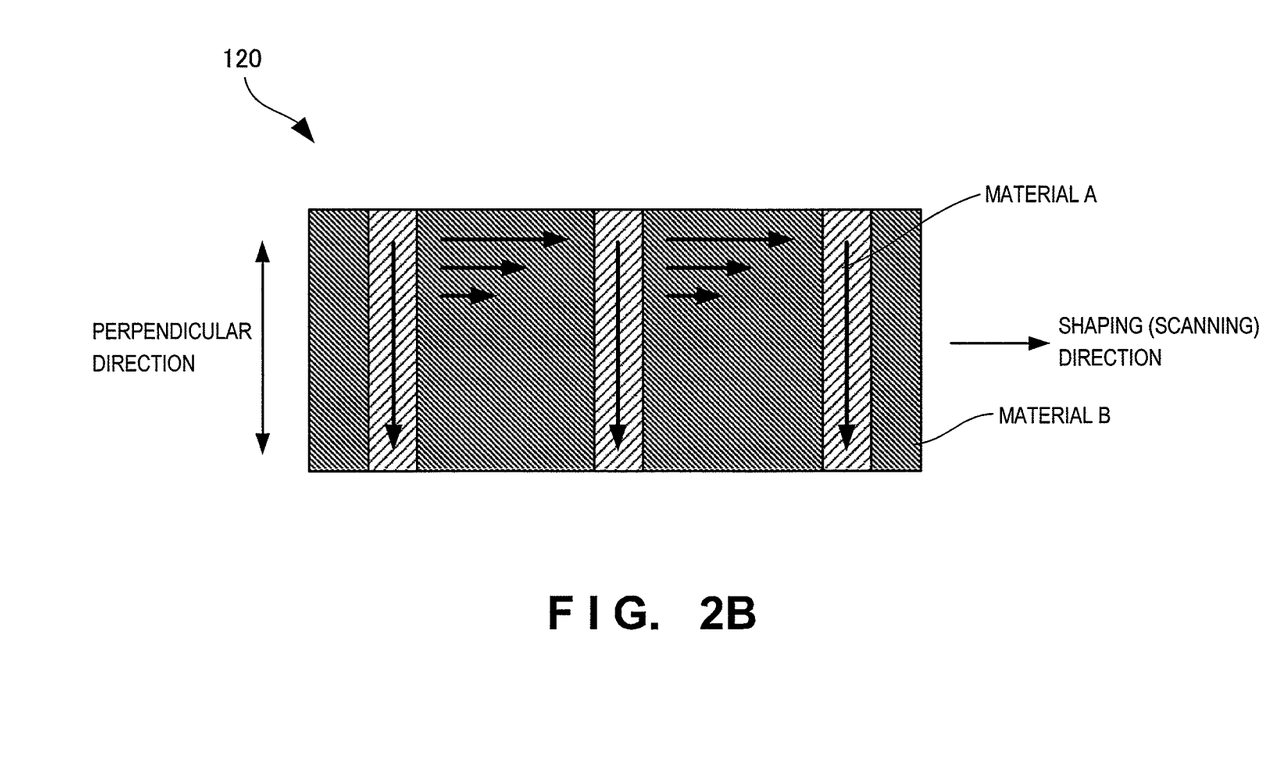
FIG. 2B is a sectional view taken along a line D-D' for explaining the arrangement of the dissimilar material-joined shaped object shaped by the three-dimensional laminating and shaping apparatus according to the first embodiment of the present invention.

FIG. 2B is a sectional view taken along a line D-D' for explaining the arrangement of the dissimilar material-joined shaped object shaped by the three-dimensional laminating and shaping apparatus according to this embodiment. Since the joining interface 201 has the corrugated shape, as shown in FIG. 2A, materials A and B are arranged to alternately appear in the shaping direction, as shown in FIG. 2B (the sectional view of FIG. 2A).

Figure 3:
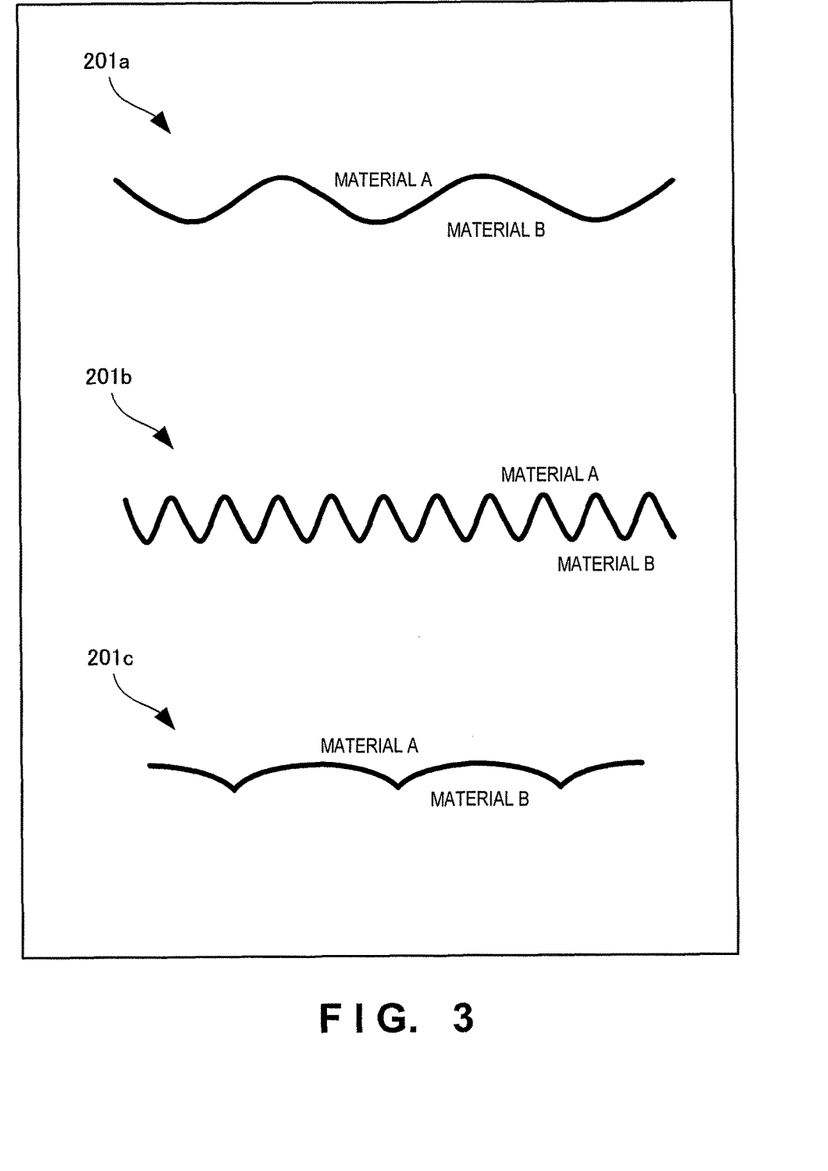
FIG. 3 is a view for explaining the arrangement of the joining interface of the dissimilar material-joined shaped object shaped by the three-dimensional laminating and shaping apparatus according to the first embodiment of the present invention.

FIG. 3 is a view for explaining the arrangement of the joining interface of the dissimilar material-joined shaped object shaped by the three-dimensional laminating and shaping apparatus according to this embodiment. As shown in 201a, 201b and 201c of FIG. 3, the joining interface 201a, 201b and 201c may have various shapes such as a sinusoidal shape and saw-tooth shape. The present invention, however, is not limited to them. For example, in addition to the shapes shown in FIG. 3, the joining interface 201a, 201b and 201c may have a rectangular wave shape, a trapezoidal wave shape, a triangular wave shape, a staircase shape, and the like.

Note that the above description assumes a method of forming a molten pool by irradiation with the laser beam or the like and ejecting the materials to the molten pool, like the LMD (Laser Metal Deposition) method. However, the present invention is applicable to a method of spreading a material on a shaping surface first, and irradiating the spread material with a laser beam or the like, like a powder bed method. An example in which a graded composition is formed in one layer has been described above. For example, however, such laminating method is applicable to the case of a plurality of layers.

According to this embodiment, since it is not necessary to provide an intermediate material such as an adhesive, it is possible to readily shape the dissimilar material-joined three-dimensional laminated and shaped object using the three-dimensional laminating and shaping apparatus. Furthermore, since the structure including no intermediate material is adopted, it is possible to use the dissimilar material-joined three-dimensional laminated and shaped object without any damage even if a temperature history from a very low temperature to a high temperature is repeatedly provided. A dissimilar material joined three-dimensional laminated and shaped object is obtained by joining dissimilar materials by a method other than explosive welding and the like, that is, laminating and shaping.

[Second Embodiment]

Figure 5:
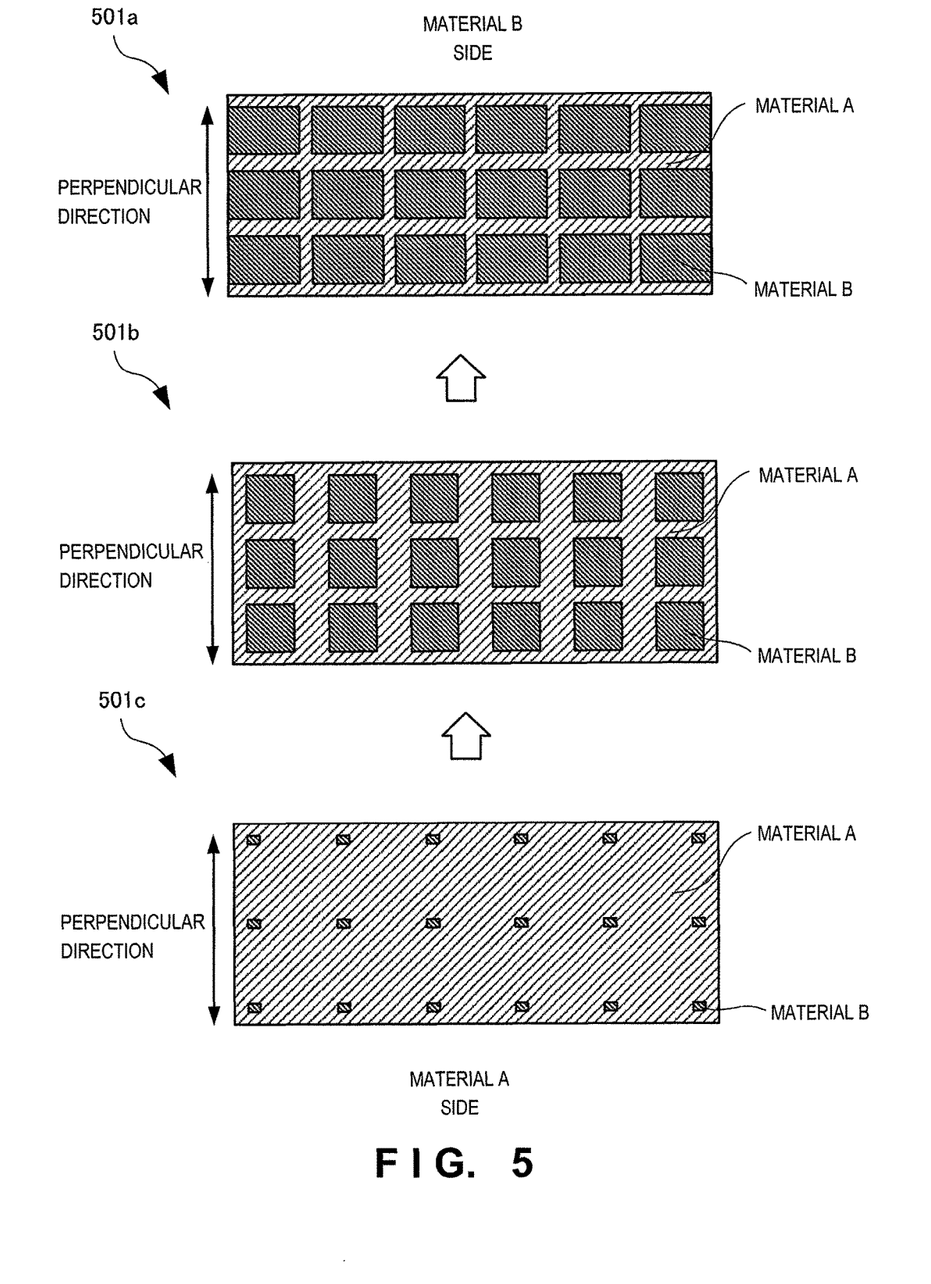
FIG. 5 is a plan view for explaining the arrangement of a dissimilar material-joined shaped object shaped by a three-dimensional laminating and shaping apparatus according to the second embodiment of the present invention.

A dissimilar material-joined three-dimensional laminated and shaped object shaped by a three-dimensional laminating and shaping apparatus according to the second embodiment of the present invention will be described with reference to FIG. 5. FIG. 5 is a plan view for explaining the arrangement of the dissimilar material-joined shaped object shaped by the three-dimensional laminating and shaping apparatus according to this embodiment. That is, FIG. 5 is a sectional view cut by a plane parallel to a joining interface 201.

A patterned graded composition is formed in a direction (a direction perpendicular to a multilayer direction) parallel to the joining boundary (joining interface 201). That is, every time a layer is laminated, the ratio of materials gradually changes. For example, as shown in FIG. 5, a graded composition may be formed such that every time the materials are laminated from the lower layer to the upper layer (501c to 501a of FIG. 5), an area occupied by material A in each layer decreases, that is, an area occupied by material B increases.

According to this embodiment, a joined member is obtained by joining dissimilar metals by a method other than explosive welding and the like, that is, laminating and shaping. In addition, even if a temperature history from a very low temperature to a high temperature is repeatedly provided, a joined member which can be used without any damage is obtained.

[Third Embodiment]

Figure 6:
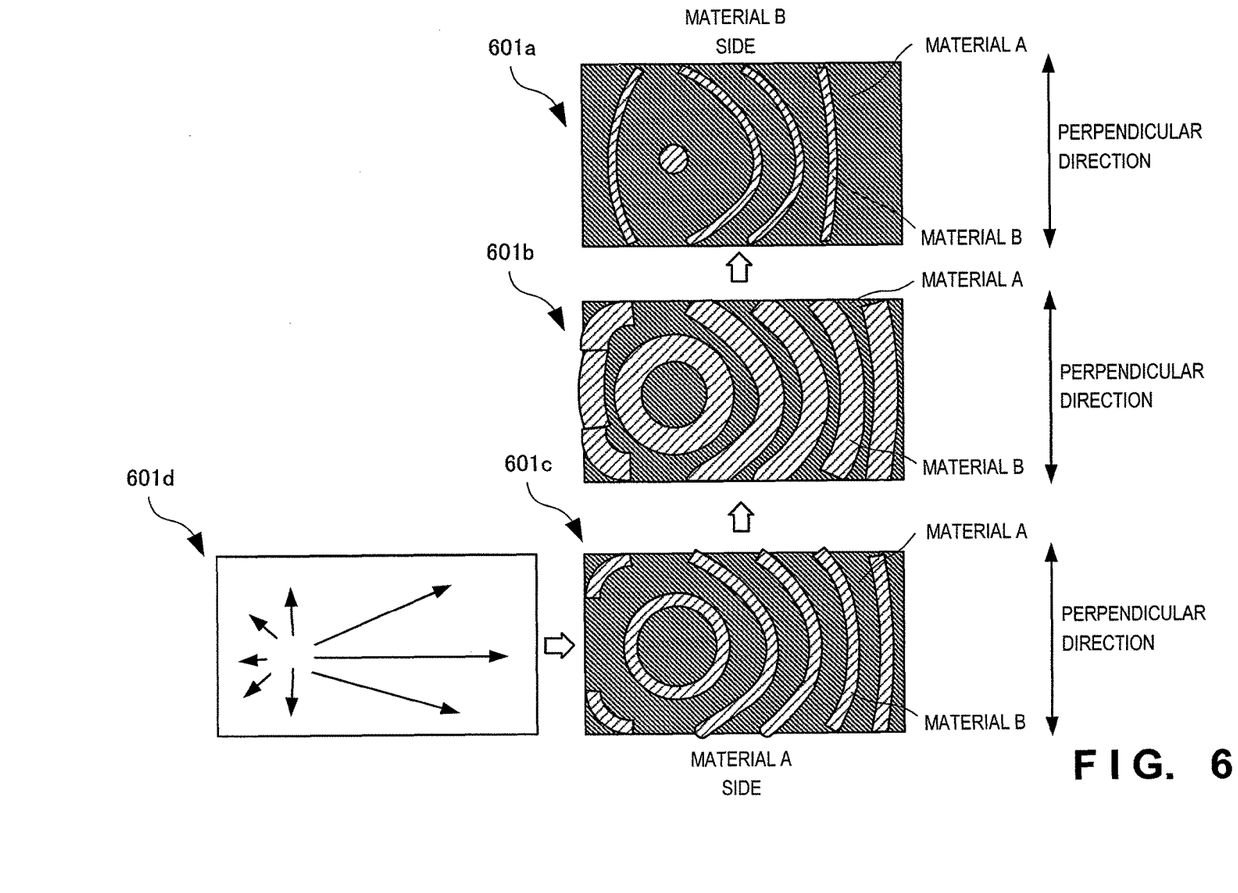
FIG. 6 is a plan view for explaining the arrangement of a dissimilar material-joined shaped object shaped by a three-dimensional laminating and shaping apparatus according to the third embodiment of the present invention.

A dissimilar material-joined three-dimensional laminated and shaped object shaped by a three-dimensional laminating and shaping apparatus according to the third embodiment of the present invention will be described with reference to FIG. 6. FIG. 6 is a plan view for explaining the arrangement of the dissimilar material-joined shaped object shaped by the three-dimensional laminating and shaping apparatus according to this embodiment. That is, FIG. 6 is a sectional view cut by a plane parallel to a joining interface 201.

A graded composition may be formed in a direction parallel to the joining boundary (joining interface 201) in accordance with the thermal expansion amount and thermal expansion direction of the dissimilar material joined three-dimensional laminated and shaped object. At this time, by forming many regions each having a graded composition in the thermal expansion direction of the shaped object, it is possible to efficiently relax a stress in the joining interface. That is, in consideration of the thermal expansion direction from the center of thermal expansion shown in 601d of FIG. 6, areas respectively occupied by materials A and B in each layer may be changed every time a layer is laminated (601c to 601a of FIG. 6).

According to this embodiment, since a pattern is formed in the direction parallel to the joining interface in accordance with the thermal expansion direction of a member, many graded composition regions are formed in the thermal expansion direction, and it is possible to efficiently relax the stress.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site.

Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
   a material supplier that supplies materials of a three-dimensional laminated and shaped object to a shaping surface;
   an irradiator that irradiates the materials with a light beam; and
   a controller that controls said material supplier,
   wherein the three-dimensional laminated and shaped object is a joined member obtained by joining dissimilar materials, and
   said controller controls said material supplier to form a graded composition of the materials in a boundary region between the dissimilar materials of the three-dimensional laminated and shaped object, wherein the boundary region is formed with a plurality of layers and the controller controls the material supplier to form the graded composition of the boundary region layer by layer with each of the plurality of layers being formed by alternately depositing a first of the dissimilar materials and then a second of the dissimilar materials such that each of the plurality of layers is formed in a direction perpendicular to a laminating direction of the first and second dissimilar materials with each of the plurality of layers comprising alternating portions of the first and second dissimilar materials.

2. The three-dimensional laminating and shaping apparatus according to claim 1, wherein the graded composition is further formed in the laminating direction.

3. The three-dimensional laminating and shaping apparatus according to claim 1, wherein the graded composition is formed in a thermal expansion direction of the three-dimensional laminated and shaped object.

4. The three-dimensional laminating and shaping apparatus according to claim 1, wherein the material supplier comprises nozzle means for scanning the object in a direction perpendicular to the laminating direction, and wherein the controller controls a speed at which the nozzle means scans the object.

5. The three-dimensional laminating and shaping apparatus according to claim 1, wherein the controller controls the material supplier such that a first of the plurality of layers comprises a different ratio of the first and second dissimilar materials than a second of the plurality of layers.

6. A control method of a three-dimensional laminating and shaping apparatus including
- a material supplier that supplies materials of a three-dimensional laminated and shaped object to a shaping surface,
- an irradiator that irradiates the materials with a light beam, and
- a controller that controls the material supplier,
- wherein the three-dimensional laminated and shaped object is a joined member obtained by joining at least two kinds of materials,
- the method comprising:
- causing the controller to control the material supplier to form a graded composition of the materials in a boundary region of the three-dimensional laminated and shaped object, wherein the boundary region is formed with a plurality of layers and the controller controls the material supplier to form the graded composition of the boundary region layer by layer with each of the plurality of layers being formed by alternately depositing a first of the at least two kinds of materials and then a second of the at least two kinds of materials such that each of the plurality of layers is formed in a direction perpendicular to a laminating direction of the first and second kinds of materials with each of the plurality of layers comprising alternating portions of the first and second kinds of materials.

7. The three-dimensional laminating and shaping apparatus according to claim 6, wherein the controller is caused to control the material supplier such that a first of the plurality of layers comprises a different ratio of the first and second kinds of materials than a second of the plurality of layers.

8. A non-transitory computer readable medium storing a control program of a three-dimensional laminating and shaping apparatus including
- a material supplier that supplies materials of a three-dimensional laminated and shaped object to a shaping surface,
- an irradiator that irradiates the materials with a light beam, and
- a controller that controls the material supplier,
- wherein the three-dimensional laminated and shaped object is a joined member obtained by joining at least two kinds of materials,
- the program for causing a computer to execute a method, comprising:
- causing the controller to control the material supplier to form a graded composition of the materials in a boundary region of the three-dimensional laminated and shaped object, wherein the boundary region is formed with a plurality of layers and the controller controls the material supplier to form the graded composition of the boundary region layer by layer with each of the plurality of layers being formed by alternately depositing a first of the at least two kinds of materials and then a second of the at least two kinds of materials such that each of the plurality of layers is formed in a direction perpendicular to a laminating direction of the first and second kinds of materials with each of the plurality of layers comprising alternating portions of the first and second kinds of materials.

9. The three-dimensional laminating and shaping apparatus according to claim 8, wherein the controller controls the material supplier such that a first of the plurality of layers comprises a different ratio of the first and second kinds of materials than a second of the plurality of layers.

* * * * *